Aug. 19, 1952  P. E. HAWKINSON  2,607,079
TIRE RETREADING MOLD

Filed Aug. 5, 1950  2 SHEETS—SHEET 1

Inventor
Paul E. Hawkinson
By his Attorneys
Merchant & Merchant

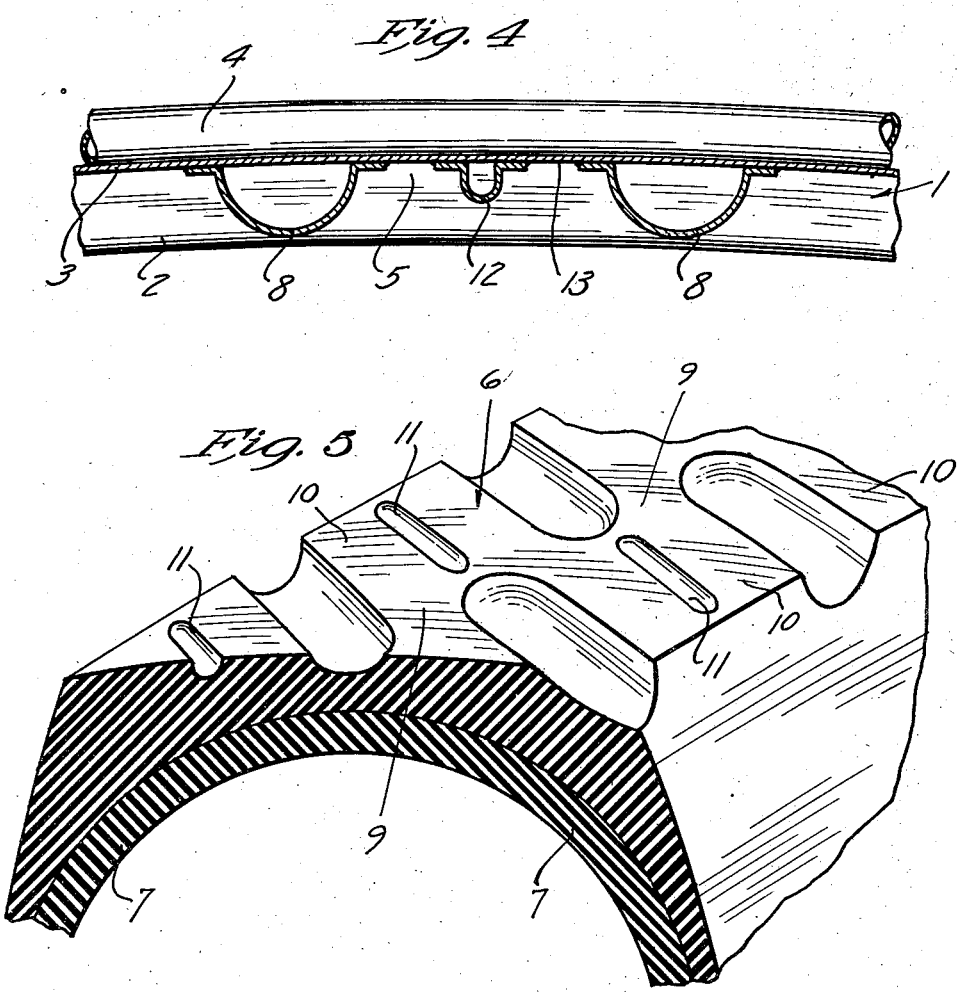

Patented Aug. 19, 1952

2,607,079

UNITED STATES PATENT OFFICE 2,607,079

TIRE RETREADING MOLD

Paul E. Hawkinson, Minneapolis, Minn., assignor to Paul E. Hawkinson Company, Minneapolis, Minn., a corporation of Minnesota Application August 5, 1950, Serial No. 177,932

1 Claim. (Cl. 18—18)

My invention relates to the art of tire retreading, and, more particularly, to tread curing matrices of the type disclosed in United States Patent No. 2,065,697.

In the use of molds of the type immediately above-described, particularly where the tread design-forming ribs are spaced apart circumferentially to provide between the cooperating ribs a relatively wide rubber tread lug, I have found that, frequently, inadequate pressure is obtained between the old and new rubber in the central portion of the lug. This objectionable feature, I have found, may be overcome by utilizing elongated narrow pressure elements in the mold approximately at the point where this lack of pressure occurs. These pressure elements have considerably less radial depth than the design-forming ribs and, therefore, do not, in any way, reduce the effective width of the lugs.

A still further object of my invention is the provision of novel pressure elements which impart a rather decorative appearance to the tread but do not detract from its wearing or traction.

The above and still further objects of my invention will become apparent from the following detailed specification, appended claim, and attached drawings.

Referring to the drawings, wherein like characters indicate like parts throughout the several views:

Fig. 4 is an enlarged fragmentary section taken on the line 4—4 of Fig. 2; and

Fig. 5 is a fragmentary perspective view of a tire casing with a tread thereon cured in the mold of Fig. 1.

Figure 1:
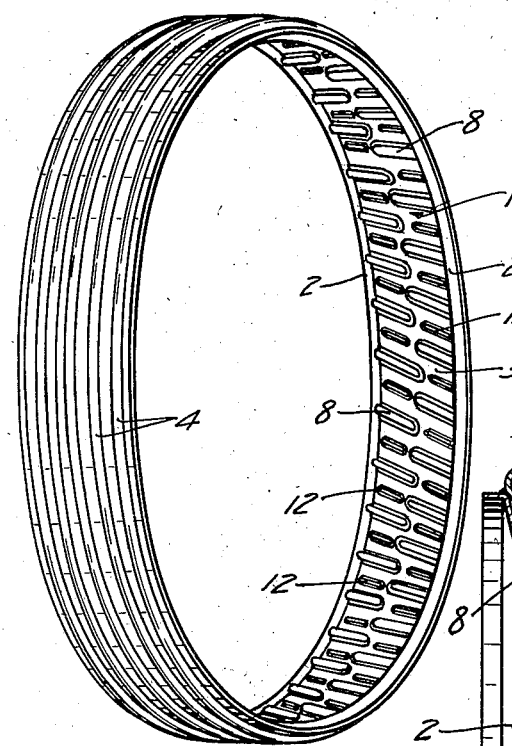
Fig. 1 is a perspective view of a retreading matrix built in accordance with my novel invention.

Referring with greater particularity to the drawings, the numeral 1 indicates, in its entirety, a retreading matrix of the "Hawkinson" type and preferably formed from an endless band of sheet metal. Adjacent its side edges, the mold 1 is formed to provide circumferentially-extended radially inwardly-projecting tread material confining flanges 2. On the outer peripheral surface 3 of the mold 1 is spirally wound a tubular coil 4 for conducting steam or other fluid heating medium. The confining flanges 2 define therebetween a cavity 5 in which the tread 6 of a pneumatic tire 7 is cured.

Figure 2:
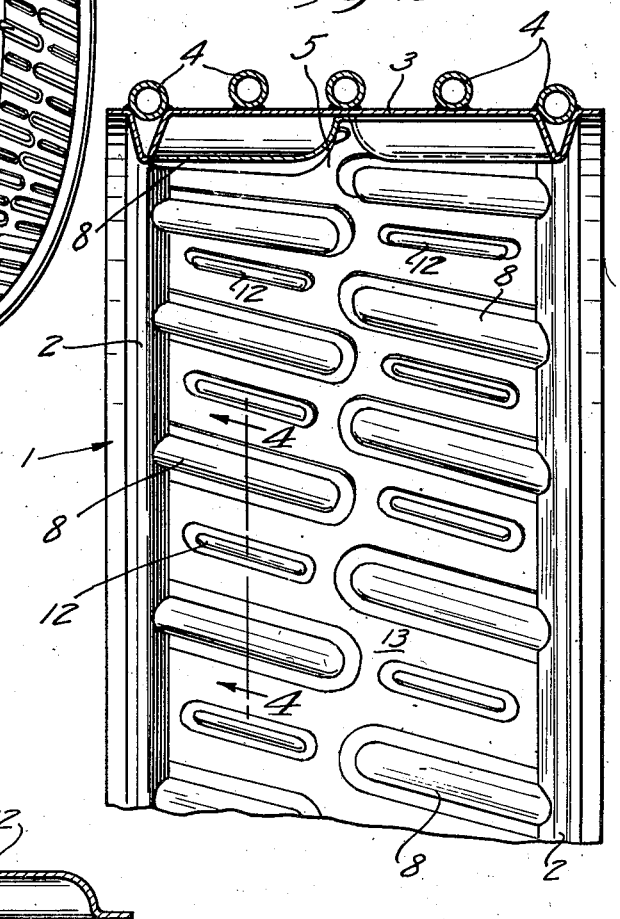
Fig. 2 is a fragmentary view in section of the device shown in Fig. 1.
Figure 3:
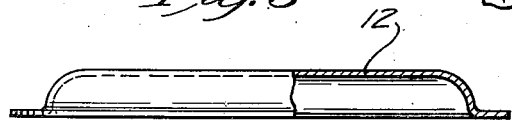
Fig. 3 is an enlarged view in side elevation of the pressure elements utilized in my novel matrix, some parts being broken away and some parts being shown in section.

Within the cavity 5, a plurality of parallel design-forming ribs 8 project angularly, but generally laterally inwardly, from the confining flanges 2. As shown, ribs 8 have a radial depth only slightly less than that of the ribs 2. Furthermore, the ribs 8 as shown particularly in Fig. 2, terminate in the central portion of the matrix 1, preferably and as shown, just short of the exact transverse center thereof. Also, as shown, the ribs 8, associated with one of the flanges 2, are staggered with respect to the ribs associated with the opposite flange 2. At their free ends, the ribs 8 are spaced from the ribs 8 on the opposite side of the matrix a distance greater than the width of the ribs 8. In this manner, a continuous though zig-zag riding strip 9 is formed on the tread 6.

The cooperating pairs of parallel ribs 8 are spaced apart circumferentially a distance considerably greater than the width of one of said ribs, whereby to produce therebetween relatively wide rubber lugs or bars 10. In order to insure adequate pressure being exerted between the uncured rubber and the old casing at the central portion 11 of the wide lugs 10, I provide, intermediate each cooperating pair of design-forming ribs 8, elongated and narrow pressure elements 12 which are similar to the ribs 8 in construction but are shorter than said ribs and of considerably less radial depth than said ribs. Both the ribs 8 and the pressure elements 12 may be stamped from sheet metal and secured to the internal peripheral surface 13 of the matrix 1 by soldering or the like, not shown.

As shown, the pressure elements 12 are centrally positioned intermediate the ribs 8 and extend generally parallel thereto. Furthermore, the pressure elements 12 on one side are in alignment with a design-forming rib 8 on the opposite side of the matrix.

By use of these pressure elements 12, I have found that adequate pressure in all portions of the matrix to insure uniform curing results.

My invention has been completely tested and found to be satisfactory for accomplishment of the above objects; and, while I have shown a commercial embodiment of the invention, it will be obvious that the same is capable of modification without departure from the spirit and scope of the invention, as defined in the claim of the invention.

What I claim is:

A tire retreading matrix comprising a cylindrical band, circumferentially extending parallel tread material confining flanges projecting inwardly from the band adjacent the opposite edges thereof, a series of uniformly spaced circumferentially arranged tread design-forming ribs projecting inwardly from each flange and terminating adjacent the circumferential center line of said band, the ribs having a depth slightly less than that of the flanges, the ribs of both series being parallel and disposed at a common angle to the axis of the band and the ribs of each series being disposed in staggered relation to the ribs of the other series, the ribs being circumferentially spaced from each other at distances substantially greater than the widths thereof for providing tread lugs of substantial circumferential extent, the free ends of the ribs of the two series thereof being spaced at distances greater than the widths thereof for providing a continuous unbroken road engaging surface at the central portion of a tread formed in the matrix, a series of elongated relatively narrow pressure elements disposed intermediate the ribs of each series thereof and having a depth materially less than that of the design forming ribs, and said pressure element of each series being in transverse alignment with the ribs of an opposing series thereof and being symmetrically arranged with respect to the corresponding ribs circumferentially of the band, whereby in the molding of the tread said pressure elements will exert a confining influence over the central area of the relatively wide and long tread lugs to hold said areas into positive and uniform bonding engagement with the carcass of a tire while forming and curing the deep design portions of the tread.

PAUL E. HAWKINSON.

REFERENCES CITED

The following references are of record in the file of this patent:

UNITED STATES PATENTS

| Number    | Name       | Date          |
|-----------|------------|---------------|
| 1,127,517 | Richardson | Feb. 9, 1915  |
| 1,280,382 | Braunwarth | Oct. 1, 1918  |
| 1,917,262 | Hawkinson  | July 11, 1933 |
| 2,065,697 | Hawkinson  | Dec. 29, 1936 |
| 2,331,680 | Hawkinson  | Oct. 12, 1943 |
| 2,333,588 | Schaevitz  | Nov. 2, 1943  |
| 2,415,291 | Kreyer     | Feb. 4, 1947  |
| 2,457,370 | Hawkinson  | Dec. 28, 1948 |